3,396,045
SEALING COMPOUND FOR HIGH
TEMPERATURE USE
Kurt Bysath, Henggart, Zurich, Switzerland, assignor to
Sulzer Brothers, Ltd., Winterthur, Switzerland, a corporation of Switzerland
No Drawing. Filed July 17, 1967, Ser. No. 653,609
Claims priority, application Switzerland, July 20, 1966, 10,515/66
3 Claims. (Cl. 106—243)

ABSTRACT OF THE DISCLOSURE

The sealing compound is used for sealing joints in casting molds and is made in a cord-like strand of a mixture comprising a mineral oil capable of reacting with oleic acid, asbestos fiber and a pulverized calcium carbonate of commercial purity. The calcium carbonate can contain up to 10% by its weight of iron magnesium silicates.

---

The invention relates to a sealing compound. More particularly, this invention relates to a sealing compound for sealing parting joints in casting molds.

In the assembly of molds and cores in iron foundries, and to some extent in steel foundries, the use of sealing compounds in the form of cord-like strands has become a recent practice. The sealing compounds have been made of different thicknesses and have been inserted into the chaplets and between mold parting joints. The purpose of the sealing compound is to prevent the discharge of liquid iron during the casting process and to minimize the "flash" produced during casting since the removal of such requires an extensive labor effort.

In order to satisfy requirements relating to processing and to the intended effect in casting it is essential for the sealing compound to have certain properties of which the most important will be briefly mentioned hereinafter.

The sealing compound must have the correct cohesion so that in the mechanical processing of the compound into a cord-like strand and a subsequent rolling on to a supporting disc the compound neither tears nor breaks but also does not adhere together. Furthermore, it is important for the workability or consistency of the compound to remain substantially unchanged in the presence of temperature fluctuations.

The compound must not lose its elasticity and plasticity even if stored for prolonged periods prior to use. The compound must therefore not harden and thus become brittle or dry. Since mold parts are often repeatedly fitted together and taken apart, it is important that the sealing compound has no adhesive effects. Furthermore, working with the compound is facilitated if it is odorless and does not stain.

Prior to the final assembly of the mold components, the molds are generally heated with a gas flame; it follows from this that the sealing compound should have a low flammability, and should not melt or harden during the flame treatment.

Also since the melt touches the sealing cord during the casting process, the sealing compound should not substantially soften otherwise it will be flushed away by the metal melt. By contrast, and after burning out of the bonding means, the compound must frit into a compact, non-brittle but elastic compound in order to allow the metal melt to solidify in the desired zones.

Since the sealing compound can be used only once and cannot therefore be re-used, it is very important for economic reasons that only relatively inexpensive materials are used as constituents for the sealing compound.

Accordingly, it is an object of the invention to provide a sealing compound which satisfies the requirements outlined above.

Briefly, the sealing compound according to the invention is characterized by a mixture comprising 18–28% by weight of mineral oil and having a neutralization index of no more than 5, a flashpoint of at least 200° C. and a viscosity of at least 10 to 30° Engler at 50° C.; 1–2% by weight of oleic acid ($C_{17}H_{33}COOH$); 15 to 20% of asbestos fiber having a fiber length of 4H to 7R; the residue being pulverized calcium carbonate of commercial purity.

The neutralization index (NZ) employed for characterizing the acidity of mineral oils, is that quantity in milligrams of anhydrous potassium hydroxide (KOH), required to neutralize the acids contained in one gram of the oil.

The viscosity of 1° Engler is defined by reference to the viscosity of water of 20° C. The values 4H to 7R are internationally agreed designations for the fiber length of asbestos fiber such as is employed in the Canadian asbestos classification.

However, since the cohesion of mineral oils is insufficient for the described task, oleic acid is added and in this way the cohesion of the mineral oil mixed with it is increased.

Asbestos fiber and calcium carbonate function as fillers, the fiber asbestos forming a skeleton structure after burning. At temperatures of approximately 900° C. the calcium carbonate is dissociated into calcium oxide forming the filler compound for the fiber skeleton, and into carbon dioxide which functions as coolant.

It has been shown that it is advantageous if up to 10% by weight of iron magnesium silicate are admixed to the calcium carbonate. At the elevated temperatures achieved during casting the said iron magnesium silicate melts into a fluid compound which surrounds the asbestos fibers to some extent. The strength and elasticity of the sealing compound is thus increased after burning out.

A mixture of 23% by weight of mineral oil having a neutralization index $NZ=0$, a flashpoint of 250° C. and a viscosity of 17° Engler at 50° C. together with 1.5% by weight of oleic acid, 18.5% by weight of asbestos fiber having a fiber length of 7R and 57% by weight of calcium carbonate containing approximately 3% of its weight of iron magnesium silicates as impurities have been found to be particularly advantageous for the sealing compound.

Further features of the invention are disclosed in the following embodiment example.

A quality of 16.16 kg. mineral oil No. 545 of Esso, 1 kg. of dark oleic acid, 12.94 kg. of asbestos fiber having a length of 7R and 40.34 kg. of pulverized calcium carbonate of commercial purity containing approximately 3% of iron magnesium silicate, are mixed and prepared in a kneader. The mixture is formed into cord-like strands by means of a piston press and is reeled on to suitable supports into a circular, single-layer strip and is then stored. For use, the strip is unwound from the supports and inserted into the parting joints of the molds or cores of a casting.

The above-mentioned mineral oil No. 545 by Esso comprises a mixture of components containing paraffin and naphthene. I has a specific gravity of approximately 0.92, a neutralization index $NZ=0$, a viscosity of 17° Engler at 50° C. and a flashpoint of 250° C.

What is claimed is:

1. A sealing compound for sealing of parting joints in casting molds consisting of a mixture comprising 18 to 28% by weight of mineral oil having a neutralization index of no more than 5, a flashpoint of at least 200° C. and a viscosity of 10 to 30° Engler at 50° C.; 1 to 2% by weight of oleic acid; 15 to 25% by weight of asbestos fiber having a fiber length of between 4H and 7R; and the remainder being pulverized calcium carbonate of commercial purity.

2. A sealing compound as set forth in claim 1 wherein said calcium carbonate contains up to 10% of its weight of iron magnesium silicate.

3. A sealing compound as set forth in claim 1 wherein said mineral oil is in an amount of 23% by weight of the mixture and has a neutralization index equal to zero, a flashpoint of 250° C. and a viscosity of 17° Engler at 50° C., wherein said oleic acid is 1.5% by weight of the mixture, wherein said asbestos fiber is 18.5% by weight of the mixture and of a fiber length of 7R, and wherein said calcium carbonate is 57% by weight of the mixture and contains approximately 3% of its weight of iron magnesium silicates as impurity.

No references cited.

MORRIS LIEBMAN, *Primary Examiner.*

H. H. FLETCHER, *Assistant Examiner.*